United States Patent [19]

Daley

[11] Patent Number: 4,491,690

[45] Date of Patent: Jan. 1, 1985

[54] REMOTE CONTROL SYSTEM FOR USE WITH A TELEPHONE

[76] Inventor: Ronald J. Daley, 6 Pinewood La., Ellington, Conn. 06029

[21] Appl. No.: 468,467

[22] Filed: Feb. 22, 1983

[51] Int. Cl.³ .......................................... H04M 11/00
[52] U.S. Cl. .................................... 179/2 A; 179/2.51
[58] Field of Search .................. 179/2 A, 2 AM, 2 R, 179/5 R, 5 P, 84 R, 89, 6.11, 6.16, 2.51; 340/310 R, 310 A

[56] References Cited

U.S. PATENT DOCUMENTS

| 3,702,904 | 11/1972 | Bard | 179/2 A |
|---|---|---|---|
| 3,927,264 | 12/1975 | Fish et al. | 179/6.11 X |
| 3,992,587 | 11/1976 | Puckett et al. | 179/2 A X |
| 4,058,678 | 11/1977 | Dunn et al. | 179/2 A X |
| 4,095,050 | 6/1978 | Beachem et al. | 179/2 A |
| 4,121,053 | 10/1978 | Dick | 179/2 A |
| 4,122,305 | 10/1978 | Fish et al. | 179/2 A X |
| 4,174,517 | 11/1979 | Mandel | 179/2 A X |

Primary Examiner—Gene Z. Rubinson
Assistant Examiner—W. J. Brady
Attorney, Agent, or Firm—McCormick, Paulding & Huber

[57] ABSTRACT

A remote control system connected to subscriber telephone lines serving a premises utilizes telephones to transmit dial-coded command signals to a central control unit where the signals are converted into actuating signals for specified devices elsewhere on the premises. The actuating signals are transmitted as pulse modulated carrier waves through utility power lines serving the premises and the devices, and specifically tuned receivers on the lines detect the appropriate actuating signals and cause an associated device to be actuated. The system also responds to ring pulses from telephones located off the premises and produces the same actuating signals for controlling the devices on the premises from distant stations.

18 Claims, 9 Drawing Figures

REMOTE CONTROL SYSTEM FOR USE WITH A TELEPHONE

BACKGROUND OF THE INVENTION

The present invention relates to control systems, and is concerned in particular with control systems which utilize telephones as the communication link.

It is already known to utilize telephone lines serving a premises as a communication link for transmitting command signals between a distant station and a controlled device. One such prior art system is disclosed in U.S. Pat. No. 4,058,678 issued to Dunn et al. The system disclosed in this patent is typical of control systems which effectively operate off hook and which require signals on the telephone line to be detected and converted to actuating signals for operating a controlled device. The transmission link within the premises utilizes available AC power lines, and the actuating signals are generated as a modulated RF carrier wave between a transmitter coupled with the telephone lines and a receiver associated with the controlled device.

Other prior art control systems that utilize a telephone link to transmit actuating signals from a distant station do not require the telephone at the controlled premises to go off hook. U.S. Pat. Nos. 4,070,549; 3,876,836 and 4,243,973 are typical of these systems. These systems generally include a ring detector which permits an individual to call the controlled premises from the remote station, and receiving equipment on the premises which senses a predetermined number or order of rings to activate or deactivate certain devices. These latter systems are desirable since the subscriber is not charged for the calls and no special equipment is required to transmit coded data through the telephone lines to the receiving equipment.

Although control of the devices from remote stations is addressed by the prior art patents referenced above, it is also desirable to exercise control over devices from locations on the premises but out of the immediate area where the controlled devices are located. Additionally, an ideal system would allow control over devices on the premises from both distant stations and phones located on the premises.

It is accordingly a general object of the present invention to provide a remote control system that permits controlled devices to be actuated through telephones on the premises and at distant stations.

SUMMARY OF THE INVENTION

The present invention resides in a remote control system for use in combination with conventional telephone and associated telephone lines. The system, when not in use, does not interfere with conventional telephone service, and when in use allows actuating signals to be transmitted through the telephone lines to a controlled device.

The system includes dialing data detecting means coupled with the telephone lines providing telephone service on the premises where the controlled device is located. The dialing data, which includes both dial pulses and dial tones, is detected from the lines and is transferred to a first decoding means connected with the dialing data detecting means for detecting a programmed access code in the data. The access code is utilized to permit the control system to discriminate between the control commands and conventional dialing data impressed on the telephone lines when outgoing calls are dialed and permits the control system to respond only when control commands are entered.

Second decoding means is also connected with the data dialing detecting means and is enabled by the first decoding means when the programmed access code has been detected. The second decoding means is used to detect a device code from the dialing data and produces a corresponding actuating signal for a particular device. An actuating means is coupled to the controlled device and responds to the actuating signal from the second decoding means to actuate the controlled device in accordance with the signal. For example, the actuating means may include a transmitter and a receiver which sends a modulated carrier wave over available power lines serving the controlled device. When the modulated wave is detected by the receiver, the device is actuated accordingly.

To permit control from distant telephone stations, a ring detector is added to the control system and a ring counter for registering the number of rings received during a given call. A count decoder produces actuating signals in response to the detected ring counts and the signals are transmitted to the controlled device in the same manner as the signals generated from the dialing data. Accordingly, the remote control system responds to commmands from both local and distant calling stations through a subscriber telephone line.

DESCRIPTION OF THE PREFERRED EMBODIMENTS

Figure 1:
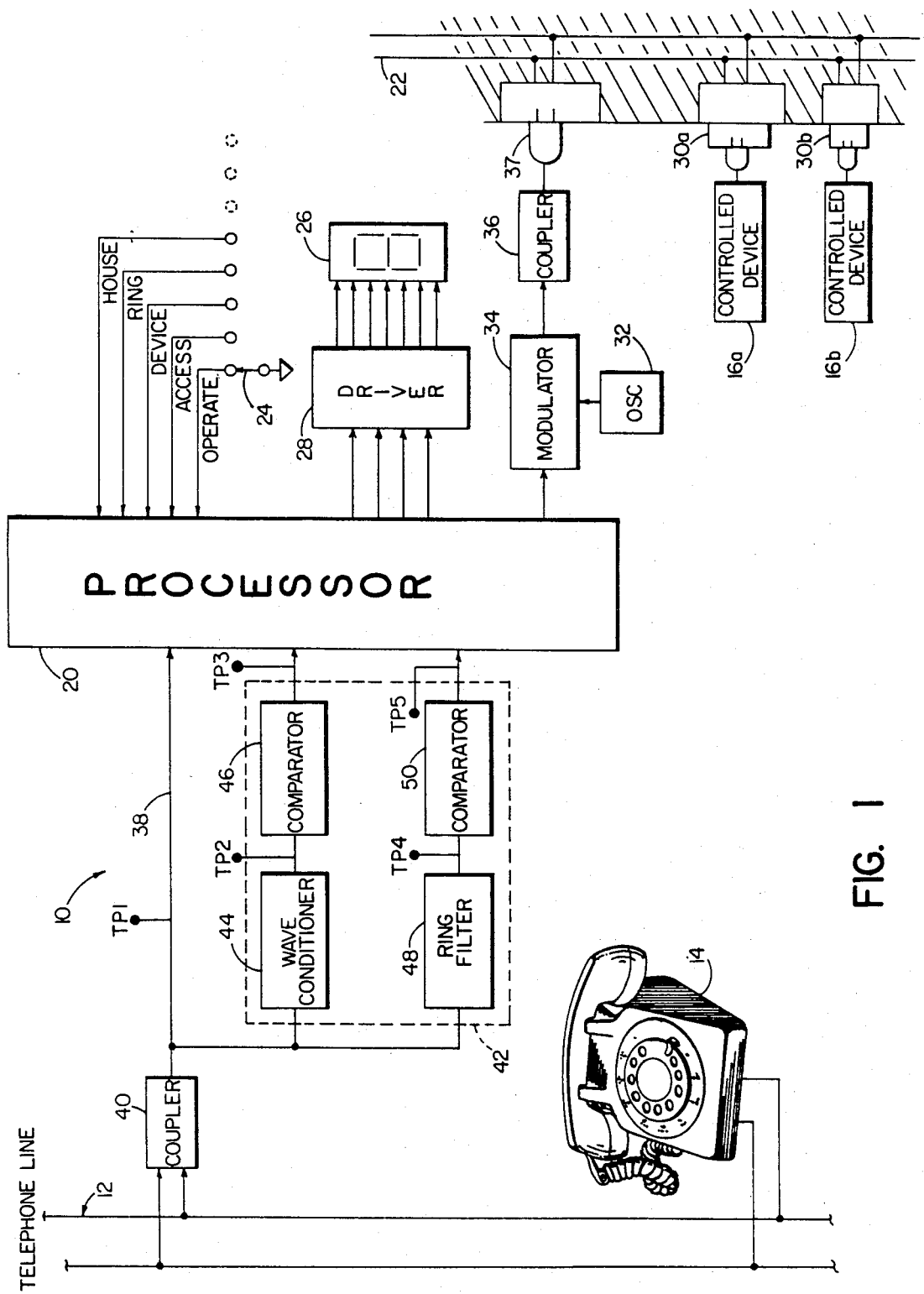
FIG. 1 is a block diagram showing one embodiment of the remote control system coupled to a subscriber telephone line.

FIG. 1 illustrates one embodiment of the remote control system, generally designated 10, for use in combination with a conventional subscriber telephone lines 12 and associated telephones 14 serving a premises where controlled devices 16a, 16b . . . are installed. Although only one telephone 14 is illustrated, it should be understood that a plurality of such phones may be placed throughout the premises and that the system 10 responds to each of the phones at the local station, and ring signals coming onto the premises on the telephone line 12 from phones at distant stations off the premises. Accordingly, the devices 16a, 16b . . . can be controlled from any phone that permits access to the telephone lines 12.

The illustrated system 10 has a central control unit including a microprocessor 20 which is appropriately programmed as described in greater detail below to perform the essential data processing functions of the system. A processor suitable for this purpose is model 8049, manufactured by Intel Corporation, Santa Clara, Calif. The microprocessor design, although preferred, is not essential, and it should be understood that equivalent hardware may be employed to perform the same functions.

In general, the control system 10 operates in response to dialing data placed on the telephone lines 12 from the telephone 14 or from ringing produced by phones at remote stations and actuates a desired one of the controlled devices 16a, 16b. The dialing data imposed on the lines by an individual on the premises includes an access code which enables the system to respond and a device code identifying a particular one of the controlled devices to be actuated. For example, the access code may be a single number between 2 and 9 if the phone is a rotary dial system or a "*" and "#" if a Touch-tone phone is employed. In the case of a rotary dial system, it is preferred that the access code be selected from one of the digits which is not the initial digit of a frequently called exchange to prevent the control system from inadvertently responding when the telephone is used to place outgoing calls. The remaining digits between 2 and 9 are then used to identify individually controlled devices or groups of controlled devices which are to be actuated when the device code number is dialed immediately after the access code number.

The control system 10 responds to the access code and the device code in the dialing data and causes a pulse-coded actuating signal to be transmitted to receivers 30a, 30b . . . for the controlled devices 16a, 16b . . . , respectively, through the AC utility power lines 22 which supply the power for operating each of the controlled devices. The pulse code is generated by the processor 20 and causes a carrier wave produced by RF oscillator 32 to be modulated by modulator 34, and the wave is then superimposed upon the AC voltage by a transmitter coupler 36 and connecting plug 37. The receiver of the device for which the signal is coded responds and the device is accordingly actuated. For example, the device 16a may be a lamp that is turned on whenever the device code associated with the lamp is dialed immediately after the access code. Other forms of actuation including adjustment of certain operating parameters may also be accomplished through the control system.

It should be understood from the above description that dialing data is imposed on the telephone lines from either a rotary dial phone 14 or from a Touch-tone phone. Therefore, the term "dialing data" is intended to comprehend pulses produced on the telephone lines by a rotary dial or tones generated from a Touch-tone key pad.

The system also responds to ring data coming in on the telephone lines 12 from distant stations. By controlling the number of rings, a person at the distant station can exercise similar control over the devices 16a, 16b . . . . The processor 20 counts the number of rings detected from the line 12 and converts the count into an actuating signal that is also transmitted over the power lines 22 to a particular one of the controlled devices. Accordingly, the devices can be controlled from telephones 14 on premises or from telephones at distant stations off premises.

Initially, it is necessary to program the processor 20 through a programming switch 24 with the proper access codes, device codes and ring counts for the respective devices. Furthermore, to avoid interference between neighboring residences or businesses connected to same utility lines 22, a house code must be programmed which further distinguishes the actuating signals transmitted over the lines 22. Actual programming is accomplished by moving the switch 24 initially to the access position from the OPERATE position and dialing the desired access code from the telephone 14. Simultaneously the access code will appear in the single digit, seven-segment display 26 energized by the processor 20 through the driver 28, and the access code is then stored in memory. To avoid connections through the subscriber telephone line to an operator or to avoid long distance connections, the numbers "0" and "1" are not used as access codes. Instead, the user selects one of the numbers 2-9 which preferably is not the first number of any prefix within the users local calling area.

The device codes and corresponding ring counts used to activate the devices are programmed next by moving the program switch to the DEVICE and RING positions, respectively. For example, if the controlled device 16a is a lamp that is to be actuated as device No. 1 when a specific coded actuating signal is transmitted by the processor through the power lines 22, then the receiver 30a connected to the power lines is tuned or adjusted to the modulated RF signal transmitted on the power lines when device No. 1 is dialed on the telephone 14 and applies power to the device when the coded RF signal is detected. Receivers of this type (wall switch module Cat. No. 61-2683 or wall outlet module Cat. No. 61-2685) are sold by Tandy Corporation, Fort Worth, Tex., and can be tuned to specific coded actuating signals as well as various house codes.

Programming for the ring mode of operation is performed through the telephone 14 by first dialing the number of the device, or the device code, while the program switch 24 is in the device position and then dialing the number of the rings desired for the device while the program switch 24 is in the ring position. Ideally, the ring count code and the dial code should be programmed to be numerically equivalent for corresponding devices. In one embodiment in the device position, up to eight different device codes can be entered for controlling eight different devices or groups of devices. In the ring position, any number of rings from 1-9 may be selected for the various devices.

The house codes are programmed by moving the switch 24 into the house code position and dialing the appropriate code. In one embodiment of the invention using the receivers 16a, 16b . . . mentioned above, sixteen different house codes are available corresponding to the letters A-P, and the code is selected by dialing the telephone 14 utilizing the dial number which is correlated with the letter on the dial face. Since there is generally a group of three different letters associated with each number on the dial face, a single letter is designated by dialing the corresponding number 1, 2 or 3 times depending upon the location of the letter in the group. For example, if the letters D, E and F are associated with the number 3 on the dial face, and if a house code corresponding to the letter F is selected, the number 3 is dialed three times since the letter F is the third letter in the group.

Each time data is entered during the programming operation, the data is indicated in the seven-segment display 26. The programmed data can also be checked through the same display. For example, the access code may be checked by simply placing the programming switch into the access position and lifting the telephone receiver "off-hook". Similarly, the number of rings required to transmit an actuating signal for a particular device can be checked by placing the program switch in the device position, dialing the number of the device and then placing the program switch in the ring position. The display will show the number of rings that have previously been programmed. The number of rings can be changed by dialing a new number and the new number will be entered when the switch 24 is moved to another position.

After the processor 20 is programmed, actuating signals can be transmitted over the power lines 22 in response to either dialing data imposed on the telephone lines 12 by the telephone 14 in a dialing mode of operation or by counting the number of rings of the telephone generated from distant stations in a ring mode of operation. In the dial mode of operation, the control system can be utilized to actuate appliances, lights or other devices anywhere within the premises served by the power lines 22 from any telephone 14 coupled to the telephone lines serving the premises. In the ring mode of operation, the same control can be exercised over the devices to turn on lights in preparation for returning to the premises, to turn lights on and off for energy conservation or creating the appearance of the premises being occupied or to simply exercise control over appliances and other devices in the house. Additionally, in the ring mode, the actuation of lights or other devices can signal the fact that the phone is ringing for persons out of range of the phone or for the deaf and hearing impaired. Accordingly, the invention can be used for remote control, energy conservation, security of the premises in which it is installed, and signaling purposes.

As shown in FIG. 1 the control system 10 is connected to the telephone lines 12 through a high-impedance coupler 40 to allow the system to function without interfering with subscriber telephone service. The coupler is connected through a data line 38 into the processor 20.

Figure 2:
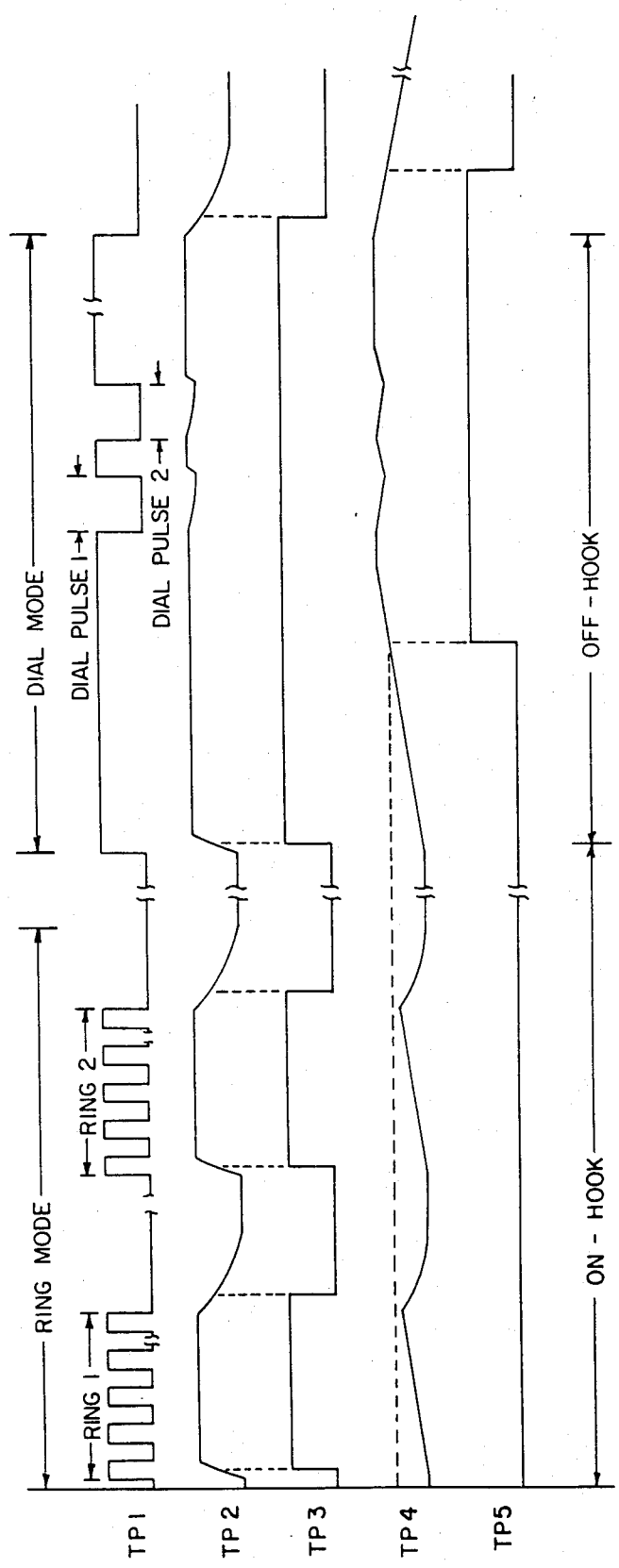
FIG. 2 is a timing diagram showing the waveforms at various test points within the system of FIG. 1 in both the ring and dial mode of operation.

To enable the processor 20 to handle both the dialing data from phone 14 and ring pulses on the incoming telephone line, a discriminator is used to set the processor in the proper mode of operation. In hardware form, the discriminator 42 is utilized as outlined in phantom. The discriminator includes a ring detector which signals the processor of an incoming telephone call and includes a wave conditioner 44 and a comparator 46. The wave conditioner is, in one form, a retriggerable single shot vibrator and effectively serves as an envelope detector for each incoming ring pulse. FIG. 2 illustrates the wave forms at the test points TP1, TP2, TP3, TP4 and TP5 in FIG. 1 for both the ring mode and the dial mode of operation. It is apparent from the output of the wave conditioner shown at TP2 that the excitation voltage in each ring pulse produces a detectable envelope, and the envelope is subsequently shaped by the comparator 46 into distinct ring pulses at TP3. Typically, the ring pulses have a two-second duration with a three-second interval between pulses.

At the same time, the ring pulses are also transmitted to an off-hook detector that is comprised by a ring filter 48 and another comparator 50. The ring filter is basically a low pass filter or integrator which does respond to lower frequency dial pulses, but not the high frequency excitation of the ring pulses. The output of the filter 48 is connected to the comparator 50 which is similarly a level detector. It will be apparent from the waveforms shown at TP4 that the ring pulses never reach the threshold level of the comparator 50 and thus the ring pulses do not enable the processor 20 in the dial mode through the off-hook detector.

On the other hand, in a dial mode of operation the removal of the handset from the telephone 14 immediately places a high-voltage off-hook signal on the telephone lines, and this signal passes through the ring filter 48 and triggers the comparator 50 to produce an enabling signal in the processor for subsequent dial pulses placed on the lines 12 for the phone. As shown in FIG. 2, the dial pulses are typically 60 msec. in duration with a 40 msec. separation, and the decay factor of the ring filter is so low that the comparator remains latched as dial pulses are read into the processor 20. At the same time, the output of the wave conditioner 44 holds the comparator 46 in a latched position and no discernable pulses are transmitted to the processor through TP3.

Accordingly, in the ring mode of operation, discernable ring pulses are applied to the processor from data line 38, and in the dial mode of operation, dial pulses are transmitted to the processor through the data line 38.

The ring count and dial pulse data derived from the telephone lines 12 is decoded and converted into actuating signals by means of the program within the processor 20. This program and the operation of the processor is described below by means of the flow charts shown in FIGS. 3-5.

Figure 3:
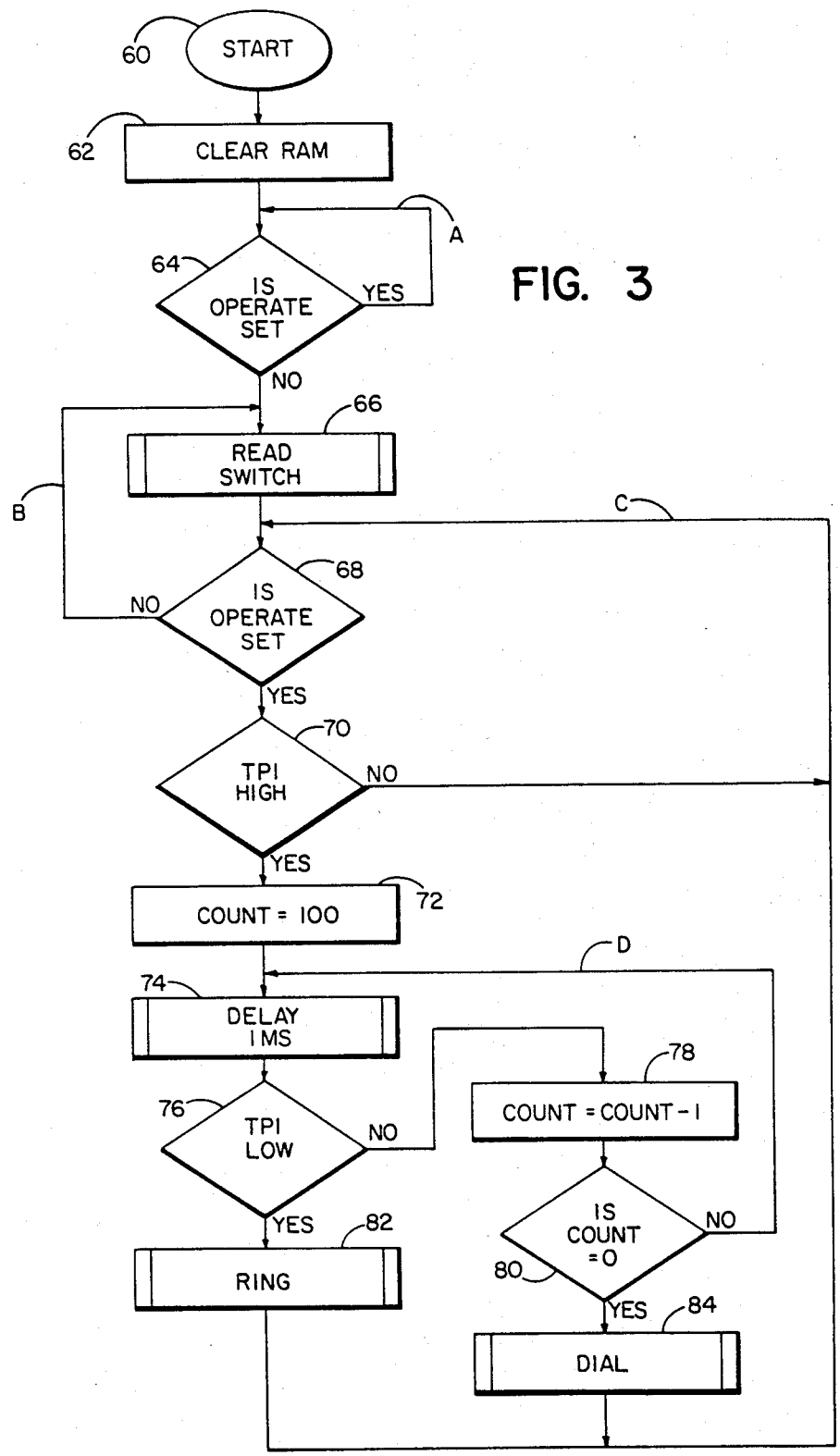
FIG. 3 is a flow chart illustrating the preliminary processing of control signals in the data processor of FIG. 1.

FIG. 3 is a subroutine of the processor program which permits the ring data to be programmed by means of the switch 24 in FIG. 1 and also includes a software discriminator that may be used in place of the hardware discriminator 42 in FIG. 1. The subroutine is entered at 60 when power is initially applied to the processor. The first step of the program causes the memories to be cleared as indicated at instruction 62. The program then examines the condition of the programming switch 24 at branch 64 to determine if the switch is in the OPERATE position or one of the other positions utilized during programming. If the switch is in the operate position, then the program waits and cycles as indicated by the loop A. As soon as the program switch 24 is moved out of the OPERATE position into one of the programming positions, the program proceeds from the branch 64 to the READ subroutine 66 which permits access codes, device codes, ring codes, and house codes to be read from the data line 38 and be stored in memory. Each time a code is read, the subroutine 66 is exited, and if the program switch 24 has not been returned to the OPERATE position, then the program returns to the READ subroutine 66 through loop B to pick up additional data such as the ring or device codes when the program switch 24 is moved to the corresponding positions. Additional program parameters such as time interval periods or automatic time of day signals for actuating the devices can be set through the program switch and other input terminals. Eventually, the programming operation is complete and the operator returns the switch 24 to its OPERATE position. At this point the program advances from the branch 68 to branch 70, the processor is fully programmed and ready to receive ring data or dialing data to actuate one of the controlled devices.

While the processor is waiting for command signals from the telephone lines 12, it repeatedly monitors the program switch 24 through loop C to determine if the switch has been moved to one of the programming positions. This cycling permits an individual to change any particular programming parameter after the codes have been initially set. As long as the programming switch remains in the OPERATE position, the processor monitors the data line 38 to detect incoming command signals.

The remaining elements in the flow chart of FIG. 3 comprise a software discriminator that may be utilized in place of the hardware discriminator 42 shown in FIG. 1. It will be observed that any time ring data or dialing data is impressed on the telephone line 12, TP1 will be set at a high-level position for either a short or a long duration. The software discriminator utilizes this time factor to distinguish between ring signals and dial pulses, and branches into the appropriate subroutine.

When branch 70 detects a high-level signal on line 38, a discriminator counter is set at 100 milliseconds by instruction 72, and then a delay subroutine 74 measures out a one-millisecond delay before the voltage level on the data line is again examined at branch 76. If after the first millisecond the voltage level on the line is still high, the counter set at instruction 72 is decremented by 1 at instruction 78 and the resulting count is examined for a ZERO count at branch 80. Since the initial count was set at 100 milliseconds, the count after the first millisecond is reduced from 100 to 99 and thus branch 80 returns the program back through loop D to the delay subroutine 74 as indicated. The program will remain locked in the D loop for a period of time depending upon the character of the signal on the line 38. Since the conventional 20 cps excitation in each ring pulse on the telephone lines returns the voltage at TP1 to a low condition in less than 100 milliseconds, a ring pulse directs the program out of the branch 76 to the ring subroutine 82 before the ZERO count is reached and detected at branch 80. In these circumstances, the program advances to the ring subroutine 82 described in greater detail below. However, if instead the handset of telephone 14 has been taken off hook in the dial mode of operation, the counter set at instruction 72 reaches the zero count before the voltage level on line 38 returns to a low level due to dialed data, and in this instance, the program is directed to the dial subroutine 84 by the branch 80.

FIG. 3 indicates that after either one of the ring or dial subroutines is exited, the program returns to branch 68 for program revision at subroutine 66 or detection of subsequent signals on the data line 38 at branch 70.

DIAL MODE

Figure 4A:
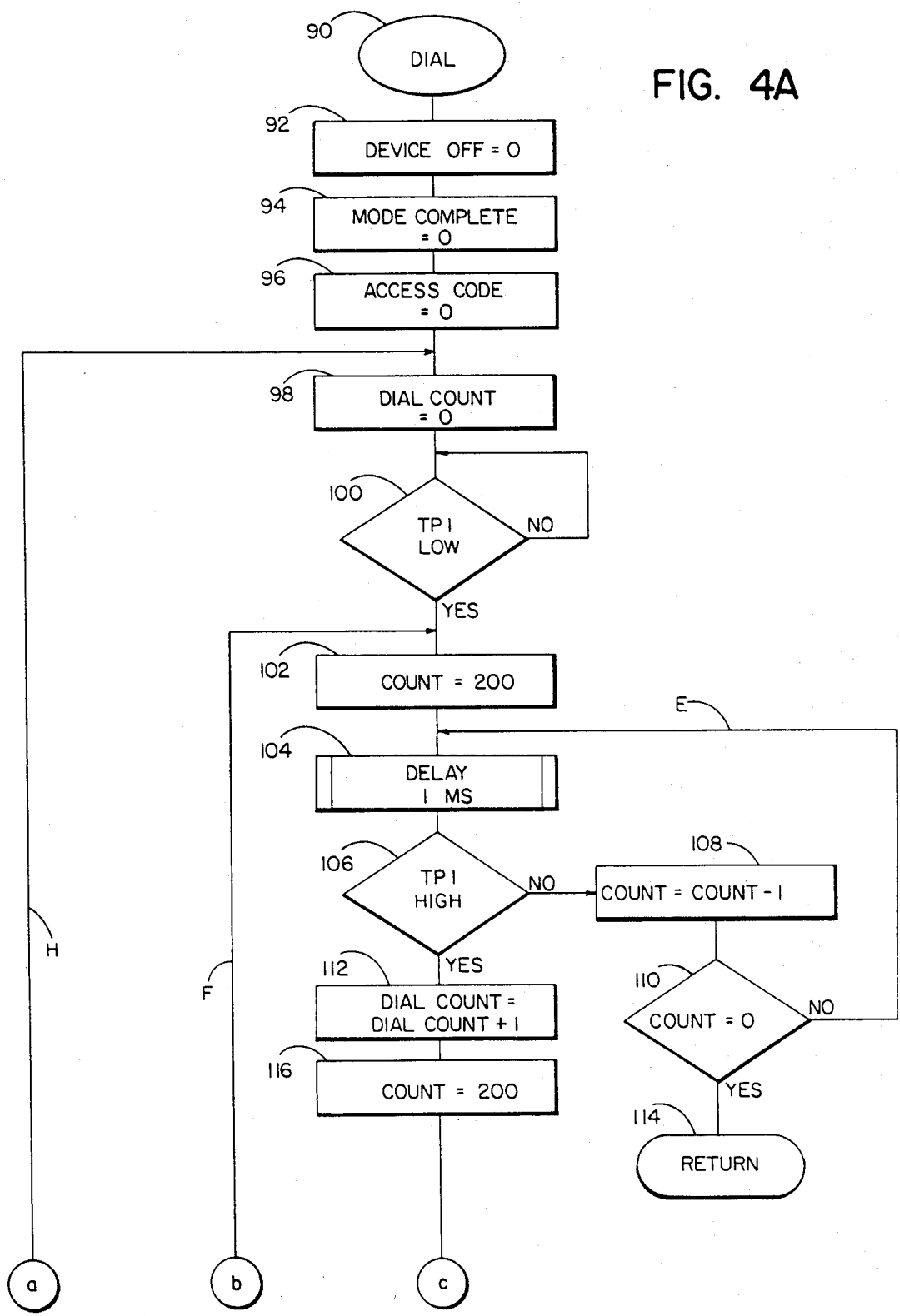
FIGS. 4a–c are flow charts illustrating the processing of dialing data through the processor in the dialing mode of operation.
Figure 4B:
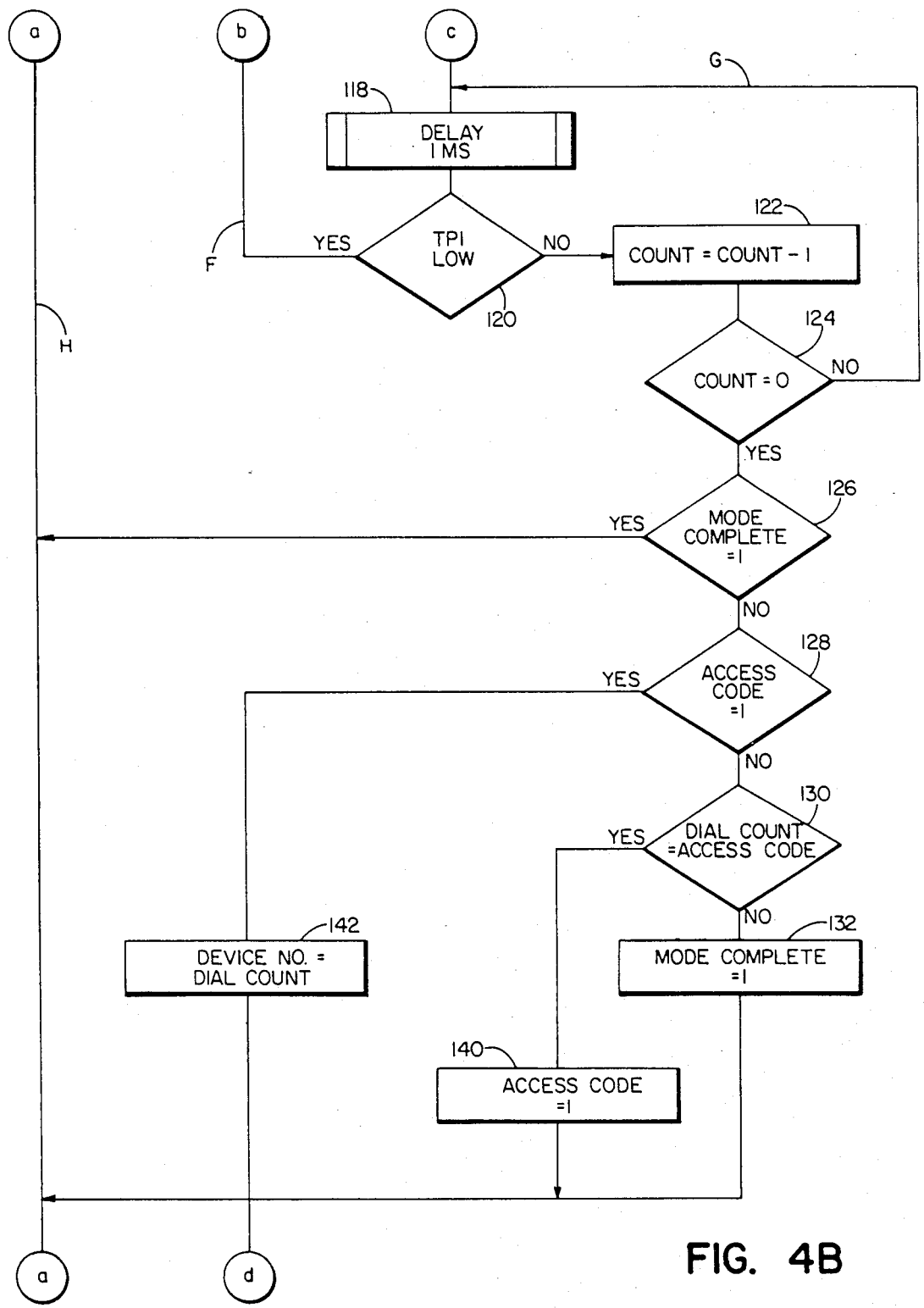
Figure 4C:
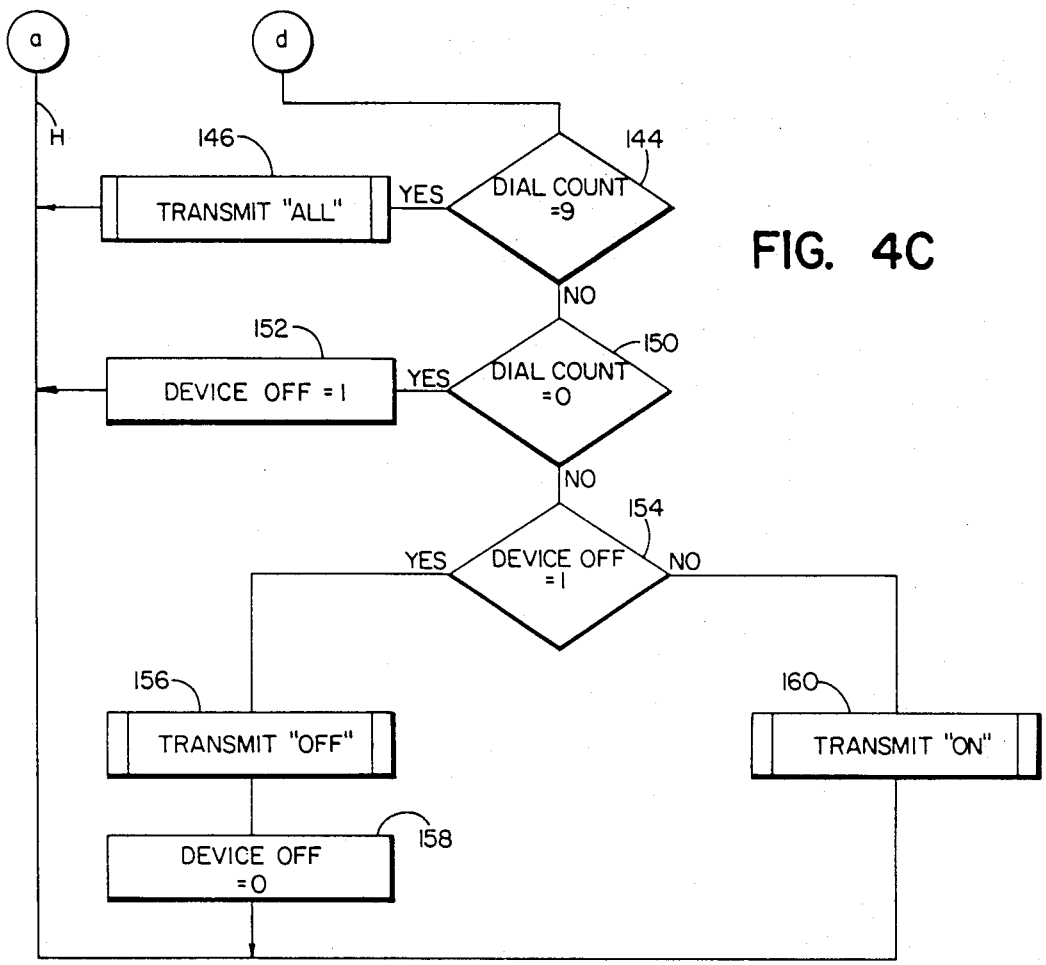

FIGS. 4a, b and c illustrate a flow chart of the dial mode subroutine 84 of FIG. 3 in detail. The subroutine is entered at 90 and immediately instructions 92, 94, 96 and 98 initialize a device-off register, a mode-complete register, an access-code register and a dial-count register, respectively, by setting these registers all to zero. The program then advances to branch 100 and examines the voltage level at TP1 until the level returns to a low level which indicates that the first dial pulse as shown in FIG. 2 is being transmitted. When the leading edge of the first pulse is detected, a time-delay counter is set at 200 milliseconds by instruction 102 and the program advances to a 1 millisecond delay subroutine 104. The counter and the subroutine 104 may be the same as instruction 72 and the subroutine 74; however, for clarity it will be assumed that distinct components are present in the processor 20.

Following a 1-millisecond delay, the voltage level of the data line 38 is examined at branch 106, and since a dial pulse is nominally 60 milliseconds in duration, the program advances to instruction 108 which decrements the counter by 1 from 200 to 199. Branch 110 then examines the count of the counter and returns the program back to the delay subroutine 104 through loop E. The program continues cycling through the loop between the subroutine 104 and branch 110 until the end of the first dial pulse at which time TP1 goes high and instruction 112 sets a dial count register at its previous count plus one. During initialization, the count in the register was set to zero and thus at the end of the first dial pulse, the register is set at a count of ONE by instruction 112.

It will be observed that while the duration of the dial pulse is approximately 60 milliseconds, if the data line 38 returns to a low voltage condition for more than 200 milliseconds, such as when the handset of telephone 14 is returned to the on-hook condition, the counter set at instruction 102 reaches the ZERO count, and the dial subroutine is exited at 114.

Assuming that the dial pulses are continuing to be received during either an outgoing telephone call or a dialing data command to the processor 20, instruction 116 sets a timing counter at 200 milliseconds. This counter with the assistance of the 1 msec. delay subroutine 118, the branch 120 and the decrement instruction 122 and branch 124 in FIG. 4b looks for the end of the interval between each dial pulse, nominally 40 msec., and at the end of such interval, the branch 120 returns the program back to instruction 102 in FIG. 4a through loop F to again set the counter at 200 for detection of the next dial pulse. At the end of that pulse, instruction 112 indexes the counter by one additional count, and the program continues to cycle through the loop F between branch 120 and instruction 102 until the end of the train of dial pulses is reached. With each cycle through instruction 112, the dial count is incremented upwardly so that a cumulative dial count is held in the dial-count register.

At the end of the first train of dial pulses, the timing counter set by instruction 116 counts out a 200-millisecond period through loop G to be certain that the last pulse has been received, and then branch 124 advances the program to branch 126 which examines the mode complete register initially set to the zero state by instruction 94. Consequently, when branch 126 is reached for the first time, the register will be in the zero state and the program advances to branch 128 to examine the access code register. This register has similarly been set in the zero state at instruction 96 and therefore the program advances further to branch 130 where the count in the dial-count register is compared with the programmed-access code. Since the first pulse train must have a count equal to the access code in order to enable the rest of the control system, if the dial count and access code do not correspond at branch 130, then the pulse train apparently represents an outgoing telephone call, not a command to the control system. In this event, the program advances to instruction 132 and the mode-complete register is set at in a 1-state. If desired, the dial subroutine could be exited at this point; however, since an exit at 114 is already provided, the program advances along loop H back to the instruction 98 and continues to track the trains of dial pulses. With the second train of dial pulses, branch 126 examines the mode register which is then set in the 1-state and immediately directs the program back into loop H. The program cycles through loop H until the handset is placed back on hook. At that point, the dial subroutine is exited at 114 without consequence as far as the remote control system is concerned.

When the first complete train of pulses comprises the access code and branch 124 reaches a zero count at the end of that train, the program advances successively to the mode-complete branch 126, the access code branch 128 and the dial-count branch 130 where the correct-access code is detected. From this branch, the program advances to instruction 140 where an access-code register is set in the 1-state and the program then returns back to the dial count instruction 98 through loop H.

The program again follows through the pulse train detecting portion counting the dial pulses and recycles through loop F until the second pulse train which represents the device number or code is complete, and at that point, the program proceeds from branch 124 and 126 to branch 128 where the access code register, previously set in the 1-state by instruction 140 is detected. The program thus advances to instruction 142 where a device number or device code register is set equal to the dial count. For example, if the second pulse train contained four pulses, then the register is set at count or code 4 to indicate that device number 4 is to be actuated. The program then proceeds to branch 144 in FIG. 4c to determine if the dial count is equal to 9. The 9 count is a common activating code for all devices and provides a convenient and abbreviated method for turning on all devices in lieu of dialing each device individually. If code 9 has been dialed, then the program advances to the transmit subroutine 146. The subroutine 146 causes the processor 20 to transmit an actuating signal in coded form that is recognized by all of the receivers 30a, 30b . . . connected to the power lines 22 and activates all of the controlled devices.

When the transmit subroutine 146 is exited, the program returns through to loop H to instruction 98 and sets the dial-count register again to zero. The program proceeds through branch 100 and branch 106 and when the operator has returned the handset to the on-hook condition, the program is exited at 114.

Assuming that a dial pulse count other code 9 is commanded, the program advances from branch 144 to branch 150 to determine if a dial-pulse count code 0 was ordered. The count 0 is reserved to transmit a deactivating signal to any device that was previously activated and turns the device off even when the device was turned on as the result of previously transmitted ring signals as described below. When the code 0 is detected by the branch 150, the program advances to instruction 152 which sets the device off register to a 1-state and the program then returns to instruction 98 through loop H. From instruction 98, the program proceeds as above to detect the number of pulses in the next train that identifies the device to be turned off. Instruction 142 sets the pulse count in the device number register and the program then advances through branches 144 and 150 to branch 154 where the device off register is examined. Assuming that this register was set in the 1-state by instruction 152, the program advances to another transmit subroutine 156 which transmits a coded actuating signal over the power lines 22 to the receivers, and that coded signal is detected only by the receiver having the device number set by instruction 142. The device is thus turned off and the program advances to instruction 158 which resets the DEVICE-OFF register in the 0-state. The program then returns to loop H and if no further pulse trains are detected, the dial subroutine is exited at 114 as described above.

Assuming that a dial count other than 9 or 0 has been dialed immediately following the access code to identify a device number, the program advances through branches 144 and 150 to branch 154 where the device-off register is detected in the zero state. The program thus advances to another transmit subroutine 160 which causes the processor 20 to transmit a coded actuating signal to the receiver for the device identified by the device number or code previously set at instruction 142. The identified device is then turned on.

As the transmit subroutine 160 is exited, the program returns to loop H, and in the absence of any further commands from the telephone lines, the dial subroutine is exited at 114 as described above.

RING MODE

Figure 5A:
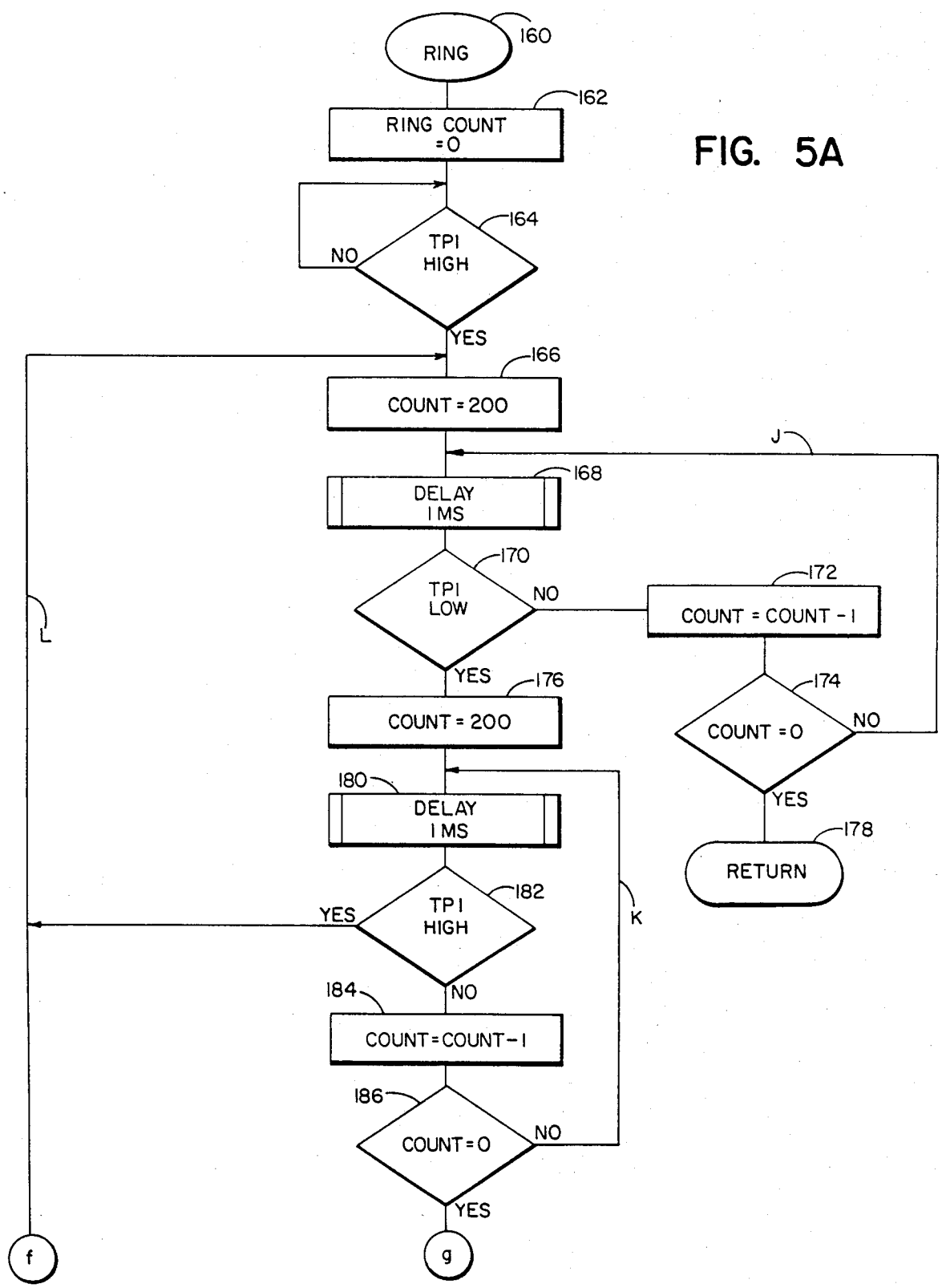
FIGS. 5a–b are a flow charts illustrating the processing of ring data in the ring mode of operation.
Figure 5B:
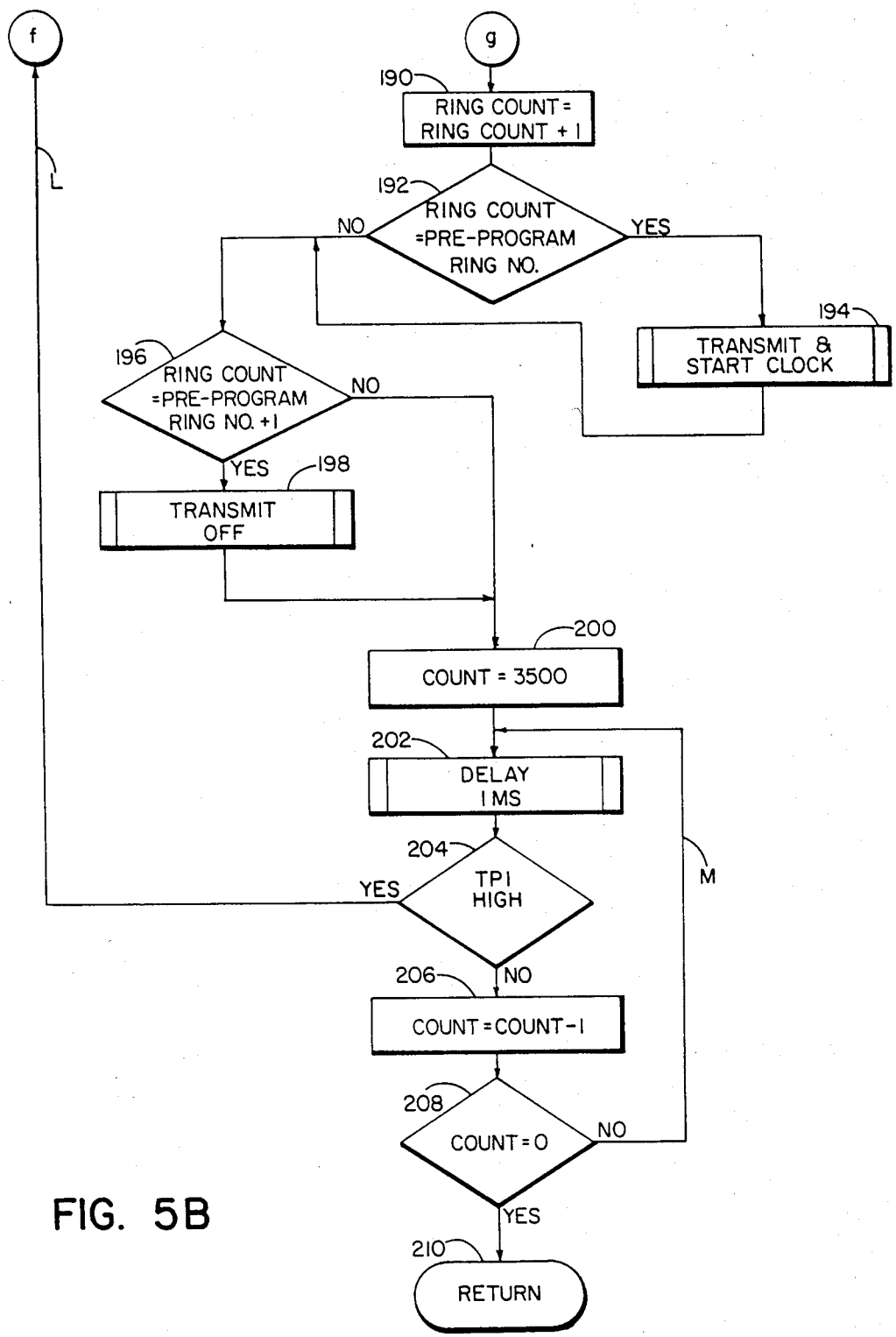

FIGS. 5a–b illustrate in detail the ring mode subroutine 82 of FIG. 3. The principal function of the ring mode is to decode the ring counts on telephone lines 12 when the user is located at a remote station and wishes to energize or de-energize devices connected to the control system 10. The subroutine is entered at 160 at the beginning of the first ring pulse while the excitation voltage on the telephone lines 12 is at a low level, and instruction 162 immediately sets a ring count register to 0 in preparation for reading and storing the number of ring pulses occurring on the line. The program advances to branch 164 and waits until the excitation voltage on the telephone lines has again achieved a high level which indicates that the ring excitation is in its second or subsequent excitation cycle of the first ring pulse. Instruction 166 then sets a time-delay counter to 200 milliseconds to be certain that the telephone has not been taken off hook. In other words, at 20 cps the excitation reaches low level within the 200 milliseconds unless the handset is removed from the telephone 14. Subroutine 168 which may be the same as subroutine 74 or 104 produces a 1 millisecond delay and then branch 170 again examines the excitation voltage. If TP1 is not low indicating that the excitation voltage is still at its high level condition, then the counter set at instruction 166 is decremented by 1 as indicated at instruction 172 and branch 174 examines the register count. During the first cycle the count is reduced to 199 and thus the loop J back to the 1 millisecond delay subroutine 168 is followed by the program. In one millisecond cycles the counter is decremented until the excitation of voltage again reaches a low level. If a ring pulse has not terminated, the program advances to instruction 176 before the 0 count is reached, but if the handset has been taken off hook, then the counter does reach a 0 count and the ring subroutine is exited at 178 without further consequence on the control system.

When the ring pulse continues, instruction 176 sets the same or another time delay counter at 200 milliseconds and a one millisecond delay subroutine 180 which may be the same as subroutine 168 and begins to measure another delay period in order to identify the end of the ring pulse. Branch 182 monitors the high-level excitation voltage immediately following the low-level voltage monitored by branch 170, and during the first examination of the excitation by branch 182, the program advances to instruction 184 which decrements the count set by instruction 176 from 200 to 199. The program then advances to branch 186 and there is forced into a loop K until the excitation rises to a high level at TP1 or the counter reaches a 0 count indicating that the excitation has terminated and one full ring pulse has been completed. If the excitation continues at a high level or the handset is taken off hook, then branch 182 directs the program back into loop L to instruction 166. Accordingly, the program will cycle through loop J as long as the excitation voltage is high, or through loop K while the excitation voltage is low. If the phone is answered, the program is exited at 178 without further consequence, and if the phone is not answered and the end of a ring pulse is reached, the program advances to instruction 190 in FIG. 5b.

Instruction 190 increases the count by one in the ring counter previously nulled by instruction 162 as a first step in decoding the ring count. As a further step, branch 192 compares the ring count with the preprogrammed ring numbers established with the aid of the program switch 24 in FIG. 1, and if the ring count is equal to a preprogrammed ring number, then the program advances to the transmit subroutine 194 and an internal time clock in the processor is started. The transmit subroutine 194 also generates a coded actuating signal corresponding to the device associated with the programmed ring number and causes the actuating signal to be transmitted over the power lines 22. The appropriate receiver 30a, 30b . . . responds to the coded signal and correspondingly actuates the associated device. When the internal clock started by the subroutine 194 reaches the end of a predetermined time period, such as one hour, the processor transmits another actuating signal to the receiver to deactivate the device if the device has not previously been deactivated.

Regardless of whether the ring count equals a preprogrammed number or not, the program eventually reaches branch 196 where the ring count is examined again. If the count is equal to a preprogrammed ring number plus one, then the program advances to a transmit subroutine 198 which causes the processor to transmit a coded actuating signal to deactivate the device corresponding to the preprogrammed ring number. Thus, devices will turn on when the ring count equals the preprogrammed number and are turned off at the preprogrammed ring number plus one.

It should be understood that ringing may continue while the decisions are made at branches 192 and 196. Thus, a preprogrammed sequence of actuating signals is generated corresponding to the sequence of ring counts that are initially programmed for the devices. This feature allows, for example, lights within the premises to be turned on and off sequentially as if a person is moving through the premises from room to room. This sequential illumination makes the premises appear to be occupied from the exterior and discourages intruders from attempting to break in.

By terminating the ringing at any particular ring count, the device associated with that count such as an external light remains activated. Thus, the residents can place a call to their premises before they return to actuate selected lights and when they return home, entryways, stairs or other locations will be illuminated. Other appliances, such as stoves and pumps, can be actuated while the residents are away from home by means of the control system and, thus, the control system provides security as well as convenience when the residents are either at home or away.

Regardless of whether the ring count corresponds to a preprogrammed number plus one or not, the program eventually advances from branch 196 to instruction 200 where a ring interval counter is set to 3500 milliseconds. After the counter has been set, the one millisecond delay subroutine 202, which may be the same as the delay subroutine 74, 104 and others, measures out delay periods before branch 204 examines the voltage at TP1 to determine if another ring pulse has been initiated. Until such a ring pulse is detected, the program cycles through instruction 206, which decrements the counter by one, branch 208 and loop M. This portion of the program is exited at branch 204 if a subsequent ring pulse is detected and the program proceeds back through loop L to the instruction 166 which resets a time-delay counter until the phone is either answered or the next ring pulse terminates as described above. The second and subsequent ring pulses are detected as described above and cause actuating signals to be transmitted over the power lines when appropriate.

After all rings have terminated, branch 208 detects the end of the 3.5 second ring interval delay established by instruction 200, and the ring subroutine is exited at 210 and returns to branch 68 in FIG. 3.

Figure 6:
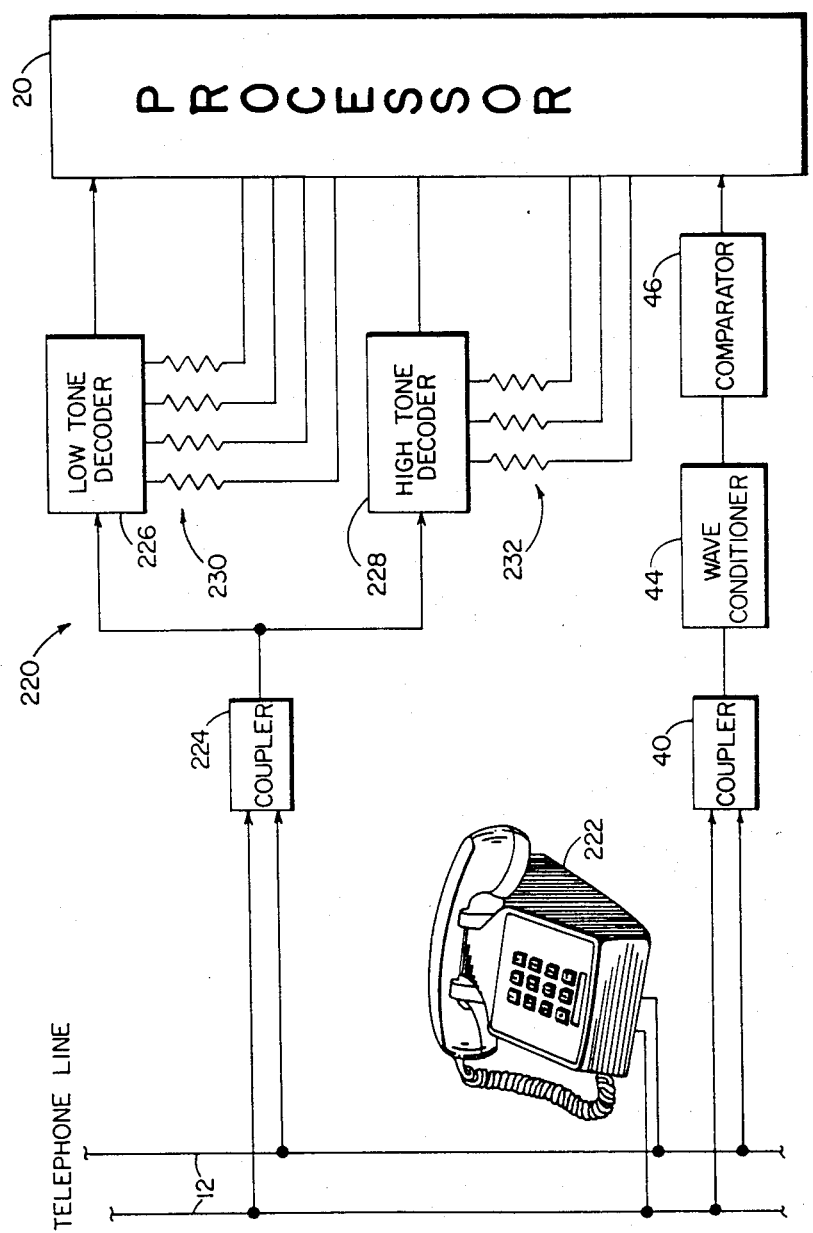
FIG. 6 shows an alternative embodiment of the control system for a touch-tone dialing telephone system.

FIG. 6 illustrates an alternate embodiment of the control system, generally designated 220, for use with a touch-tone telephone 222. Corresponding elements of the system 10 in FIG. 1 and the system 220 in FIG. 6 bear the same reference numerals.

The system 220 is constructed and operates in substantially the same manner as the system 10 except that the touch-tone telephone 222 imposes dual tones of various frequencies on the telephone lines 12 and a coupler 224 transmits those tones to a high-tone decoder 226 and low-tone decoder 228. Conventional tone codes are comprised by a high and a low frequency and the decoders 226 and 228 are two phase-locked loop circuits with RC time constants that are varied by the resistors 230 in the low-tone decoder and the resistors 232 in the high-tone decoder. When resonance with a specific tone occurs, the decoders produce an output signal. Discrimination between one low tone and another is accomplished by the processor 20 which sequentially and individually enables each of the resistors 230. The resonant condition is immediately correlated with the enabled resistor to determine which of the tones has been dialed. The high-tone decoder operates in the same manner and sequentially enables each of the resistors 232.

After the high tone and low tone have been detected, the tones are correlated with a specific controlled device, or a common actuating code, and an appropriately coded actuating signal is produced and is transmitted over the power lines by the RF modulator 34 and coupler 36.

Accordingly, a remote control system has been described which utilizes the subscriber telephone system serving the premises. The control system operates with efficiency from a central control unit, both in a dial mode to allow controlled devices to be actuated within the premises and in a ring mode for controlling the devices from remote calling stations.

While the present invention has been described in a preferred embodiment, it should be understood that numerous modifications and substitutions can be had without departing from the spirit of the invention. For example, the invention advantageously employs available power lines to communicate the actuating signals from the processor 20 to each of the controlled devices; however, if desired an independent transmission link such as a radio system or special cabling could also be utilized. It is also apparent that the dial mode of operation may be utilized without the ring mode in a totally integrated control system serving the premises. Accordingly, the present invention has been described in a preferred embodiment by way of illustration rather than limitation.

I claim:

1. A remote control system for use in combination with a conventional telephone and associated telephone lines for transmitting actuating signals to a controlled device comprising:
    dialing data detecting means coupled with the telephone lines providing telephone service in a premises for detecting dialing data from the lines;
    first decoding means connected with the dialing data detecting means for detecting a programmed access code from detected dialing data;
    second decoding means also connected to the dialing data detecting means and enabled by the first decoding means when the programmed access code has been detected for detecting a device code from the dialing data and producing an actuating signal for a controlled device;
    ring counting means coupled to the telephone lines on the premises for counting the number of rings on an incoming line from distant calling stations;
    ring count decoding means connected with the ring counter for detecting ring counts corresponding in number uniquely with a controlled device and producing an actuating signal; and
    actuating means coupled to a controlled device and responsive to one of the actuating signals from the second decoding means and the ring count decoding means for actuating the controlled device in accordance with the signal whereby a controlled device can be actuated from both distant stations and telephones on the premises.

2. A remote control system for transmitting actuating signals to a controlled device as defined in claim 1 in a premises having electrical power lines supplying power for the controlled device wherein the actuating means includes
    transmitter means connected to the second decoding means and coupled to the electrical power lines for transmitting the actuating signs over the power lines; and
    receiving means coupled to the power lines and connected to the controlled device for actuating the device upon receipt of the actuating signal from the transmitter means.

3. A remote control system for transmitting actuating signals as defined in claim 2 wherein:
    the transmitting means provides a plurality of coded actuating signals, each signal being uniquely coded by both the device code detected by the second decoding means and the ring count detected by the ring count decoding means; and
    the receiver means includes a plurality of receivers connected to the power lines and a plurality of controlled devices respectively, each receiver being sensitive to one of the coded actuating signals for actuating the controlled device connected to the receiver in accordance with the device code and the ring count.

4. A remote control system for transmitting actuating signals as defined in claim 2 wherein the transmitting means includes an RF oscillator for generating an RF carrier wave superimposed on the power line voltage, and a modulator for modulating the carrier wave in accordance with the device code detected by the second decoding means and the ring counts detected by the ring count decoding means.

5. A remote control system for transmitting actuating signals as defined in claim 1 wherein
    the dialing data detecting means comprises a coupling connected with the telephone lines and detecting the dialed tones produced on the line by a coded tone generating telephone; and
    the first and second decoding means include tone decoders identifying the dialed tones.

6. A remote control system for transmitting actuating signals as defined in claim 1 wherein:
    the dialing data detecting means comprises a coupling connected with the telephone lines and detecting dialed pulses produced on the line by a rotary dial telephone; and
    the first and secnd decoding means include a pulse counter identifying the dialed pulses.

7. A remote control system for transmitting actuating signals as defined in claim 1 wherein the ring count decoding means and the second decoding means produce the same actuating signal for numerically equivalent ring counts and device codes.

8. A remote control system for transmitting actuating signals as defined in claim 1 wherein:
    a time clock providing a deactivating signal is also included; and
    the actuating means is connected with the time clock and is responsive to the deactivating signal for deactivating the controlled device.

9. A remote control system for transmitting actuating signals as defined in claim 1 further including
    third decoding means connected to the dialing data detecting means and enabled by the first decoding means for detecting from the dialing data a deactivating code and producing a deactivating signal; and
    the activating means is responsive to the deactivating signal to deactivate an actuated device.

10. A remote control system as defined in claim 9 wherein the actuating means is jointly responsive to the second and the third decoding means to deactivate a specific device in the control system.

11. A remote control system as defined in claim 9 wherein the actuating means includes a transmitter connected with the second and third decoding means and a power line supplying power to the controlled device for transmitting both actuating and deactivating signals to the device, and the actuating means further includes a receiver connected between the power line and a controlled device for receiving transmitted activating and deactivating signals and controlling the device correspondingly.

12. A remote control system for transmitting actuating signals as defined in claim 1 further including
    additional decoding means connected to the dialing data detecting means and enabled by the first decoding means when the programmed access code has been detected for detecting from the dialing data a common activating code for all devices in the system and producing a corresponding signal; and
    the actuating means is discriminately responsive to the actuating signals produced by the device code and the common activating code to actuate a specific device and all devices, respectively.

13. A remote control system for connection to a subscriber telephone system serving a premises to individually control a plurality of devices on premises from both on-premises and off-premises phones comprising:

dialing data detecting means coupled to the subscriber telephone lines on the premises for detecting dialing data placed on the lines from an on-premises phone in the off-hook condition;

dialing data decoding means coupled to the dialing data detecting means for detecting a plurality of device codes from the data and producing individual actuating signals corresponding respectively with the plurality of devices;

ring counting means coupled to the subscriber telephone lines on the premises for counting rings generated on the lines in the on-hook condition by an off-premises telephone and establishing corresponding ring counts;

ring count decoding means conected to the ring counting means for producing from the ring counts individual actuating signals corresponding respectively with the plurality of devices;

and actuating means responsive to the individual actuating signals of both the dialing data decoding means and the ring count decoding means for actuating the controlled devices corresponding respectively to the individual actuating signals.

14. A remote control system for connection to a subscriber telephone system as defined in claim 13 wherein the dialed numbers producing the device codes detected by the dialing data detecting means, and the ring counts are numerically the same for the corresponding controlled devices.

15. A remote control system for connection to a subscriber telephone system serving a premises as defined in claim 13 further including enabling means connected to the dialing data detecting means for detecting an access code from the dialed data and producing an enabling signal; and the dialing data decoding means is connected with the enabling means and responsive to the enabling signal to detect the device codes.

16. A remote control system as defined in claim 13 further including discriminating means connected to the telephone lines for enabling the dialing data detecting means and the ring counting means in accordance with the signals on the lines.

17. A remote control system as defined in claim 13 wherein:

the decoding means and the counting means are incorporated in a central control unit comprised by a programmed microprocessor; and the microprocessor includes means for programming the system codes and counts through phones connected to the telephone lines.

18. A remote control system as defined in claim 17 which has an access code for enablement of the dialing data decodng means wherein the microprocessor also includes means for programming the access code.

* * * * *